June 11, 1968  C. A. ALLEN ET AL  3,387,869

AXIALLY ADJUSTABLE RIGID SHAFT COUPLING

Filed April 1, 1966

Inventors
C. Alvin Allen
Edward F. Looney
Paul M. Freeze

By John P. Hines
Attorney

United States Patent Office 3,387,869
Patented June 11, 1968

3,387,869
AXIALLY ADJUSTABLE RIGID SHAFT COUPLING
Charles Alvin Allen, Hamilton, Edward F. Cooney, Norwood, and Paul M. Freeze, Mason, Ohio, assignors to Allis-Chalmers Manufacturing Company, Milwaukee, Wis.
Filed Apr. 1, 1966, Ser. No. 539,438
2 Claims. (Cl. 287—62)

ABSTRACT OF THE DISCLOSURE

A rotary shaft coupling for connecting two axially aligned shafts having a connection between the shafts and the coupling to permit relative axial adjustment of the shafts.

---

This invention pertains to a coupling for connecting two aligned rotating shafts and more particularly to such a coupling which permits axial adjustment between the shafts without dismantling the coupling.

There are numerous applications which require connecting two rotating shafts for the transmission of power and wherein axial adjustment of the shafts is required. A pump-motor combination is one example of this type of application and the present invention will be described in relation to such a combination. It should be understood however that it is not intended to limit this invention to a pump-motor combination.

The pump impeller must be adjusted relative to the pump housing for most efficient pump operation. This can be accomplished by moving either the pump or the motor housing relative to the other. However, when this is done it is necessary to dismantle the shaft coupling which may result in disalignment of the two shafts. With applicants' invention it is possible to make very precise and minute relative axial adjustments of the two shafts without changing the relative positions of the motor or pump housings and without dismantling the shaft coupling.

It is therefore the object of this invention to provide a shaft coupling which permits relative axial adjustment of the rotating shafts without requiring a dismantling of the coupling.

Figure 1:
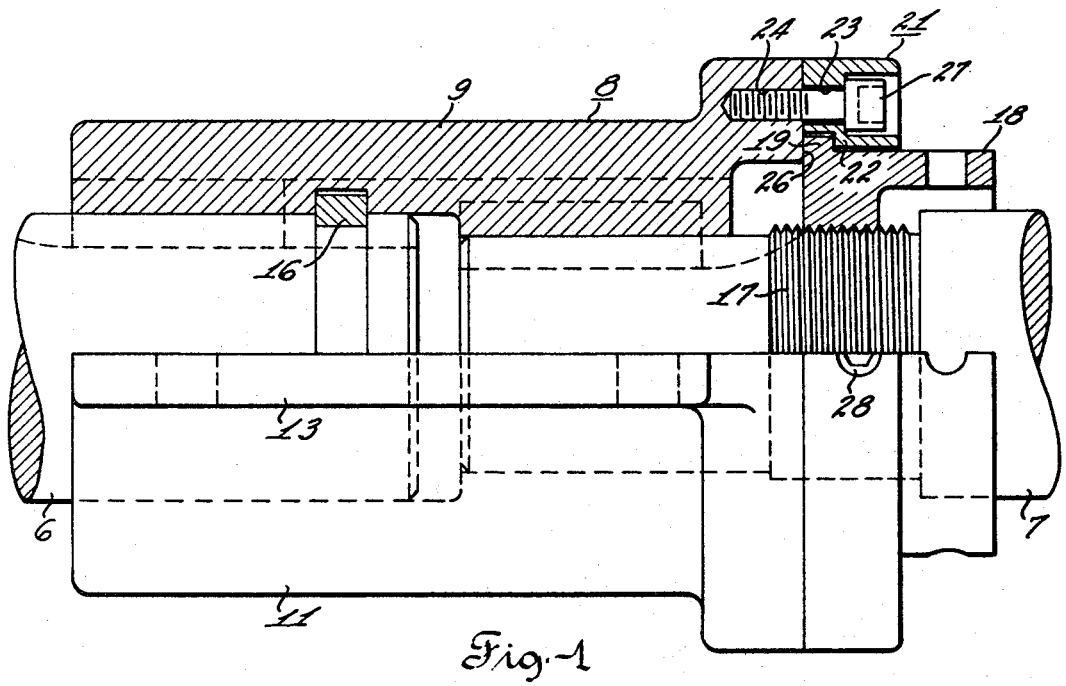
Figure 2:
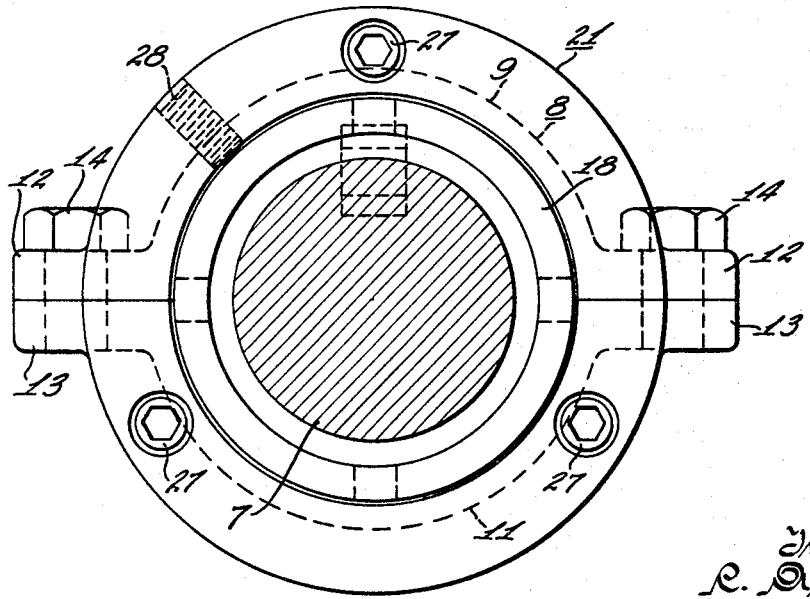

This and other objects of the subject invention will become more fully apparent as the following description is read in light of the attached drawing, wherein:

FIG. 1 is a partial cross sectional elevation of a coupling constructed in accordance with the invention; and FIG. 2 is an end view of the coupling.

Referring to the drawing, it is desired to connect a motor shaft 6 to a pump shaft 7. This is accomplished by means of a shaft coupling generally designated 8. The coupling has a horizontally split casing composed of an upper casing half 9 and a lower casing half 11. Each casing half is provided with a mating longitudinally extending flange 12 and 13 respectively. The upper casing half may be provided with a plurality of axially spaced bores and the lower casing half would then be provided with matching threaded bores. Cap screws 14 threaded into the internally threaded bores in the lower casing half 11 provide the connection between the upper and lower casing halves.

Each shaft is provided with a conventional key-way which is aligned with a mating key-way in the interior peripheral surface of the bore of the coupling. The motor shaft 6 is provided with an annular peripheral groove in that portion of the shaft contained within the coupling. A complementary annular groove in the interior surface of the bore of the coupling is aligned with the annular groove in the motor shaft. A split thrust ring 16 is inserted in the mating grooves to prohibit relative axial movement between the motor shaft and the coupling 8.

The pump shaft 7 has a threaded portion 17 thereon not contained within the bore of the coupling. An adjusting nut 18 having an internal thread is adjustably contained on the threaded portion 17 of the pump shaft. The adjusting nut is provided with an annular shoulder 19 on the end adjacent the coupling 8.

A nut retainer 21 having a shoulder 22 thereon is positioned in overlying engagement about the adjusting nut 18 and on the axially outer side of the annular shoulder 19 of the adjusting nut. The nut retainer 21 has a plurality of circumferentially spaced bores 23 therethrough which align with threaded bores 24 in the annular end surface 26 of the shaft coupling 8. Screws 27 threaded into the bores 24 hold the nut retainer against movement relative to the coupling 8. The adjusting nut 18 may also be provided with one or more set screws 28 to lock the nut in its adjusted position.

The procedure for adjusting the position of the pump shaft is as follows. The set screws 28 in the adjusting nut and the screws 14 in the flanges 12 and 13 are loosened. The adjusting nut is then turned in either direction, depending on which direction adjustment is desired. If it is desired to move the pump shaft 7 to the left, the adjusting nut is turned counterclockwise causing the adjusting nut shoulder 19 to bear against the shoulder 22 of the nut retainer. This causes the pump shaft 7 to move to the left, repositioning the pump impeller. If it is desired to axially adjust the pump shaft to the right, the adjusting nut is turned in a clockwise direction. This causes the adjusting nut shoulder 19 to bear against the surface 26 on the coupling 8. In this manner the pump shaft 7 is moved to the right. After the shaft has been moved to its newly adjusted position, the screws 14 are tightened. The set screws 28 are then turned into place, holding the adjusting nut against rotation.

From the above it can be seen that a coupling has been provided which permits minute axial adjustment between two rotating shafts. This adjustment can be made without dismantling the coupling and without disrupting the axial alignment between the two shafts.

Although only one embodiment of the subject invention has been herein shown and described, it will be obvious to those skilled in the art after reading this description that other modifications are possible, and it is intended that all such modifications as come within a reasonable interpretation of the appended claims be covered.

The embodiments of the invention in which our exclusive property or privilege is claimed are defined as follows:

1. A coupling for connecting two shafts which are axially aligned comprising: a casing having axially aligned bores therein receiving adjacent ends of said shafts; means cooperating with one of said shafts and said casing to prevent both relative rotational and axial movement therebetween; means cooperating with the other of said shafts and said casing to prevent only relative rotational movement therebetween; a plurality of axially spaced projections rigid with said other of said shafts; adjusting means having a plurality of complementarily spaced projections in force transmitting engagement with said shaft projections whereby rotation of said adjusting means causes relative axial movement between said shaft and said adjusting means; and retaining means rotatably supporting said adjusting means to said casing and prohibiting relative axial movement therebetween.

2. The coupling set forth in claim 1 wherein said engageable means is a thread on the portion of said other of said shafts external of the bore of said casing and said adjusting means is a nut having internal threads mating with the threads on said other of said shafts and further comprising locking means selectively engageable with said other of said shafts and said adjusting means to hold same against relative movement.

References Cited

UNITED STATES PATENTS 2,510,377   6/1950   Carr _____ 287—125

EDWARD C. ALLEN, *Primary Examiner.*

CARL W. TOMLIN, *Examiner.*

W. L. SHEDD, *Assistant Examiner.*